(12) United States Patent
Gilat

(10) Patent No.: US 12,335,086 B2
(45) Date of Patent: Jun. 17, 2025

(54) SPREAD-SPECTRUM VIDEO TRANSPORT WITH QUADRATURE AMPLITUDE MODULATION

(71) Applicant: HYPHY USA INC., San Jose, CA (US)

(72) Inventor: Ofir Gilat, Givatayim (IL)

(73) Assignee: HYPHY USA Inc., San Jose, CA (US)

( * ) Notice: Subject to any disclaimer, the term of this patent is extended or adjusted under 35 U.S.C. 154(b) by 282 days.

(21) Appl. No.: 17/851,821

(22) Filed: Jun. 28, 2022

(65) Prior Publication Data

US 2023/0012044 A1    Jan. 12, 2023

Related U.S. Application Data

(60) Provisional application No. 63/318,204, filed on Mar. 9, 2022, provisional application No. 63/220,587, filed on Jul. 12, 2021.

(51) Int. Cl.
*H04L 27/36* (2006.01)
*H04B 1/69* (2011.01)
*H04L 27/38* (2006.01)

(52) U.S. Cl.
CPC ............... *H04L 27/36* (2013.01); *H04B 1/69* (2013.01); *H04L 27/38* (2013.01)

(58) Field of Classification Search
CPC ............ H04L 27/36; H04L 27/38; H04B 1/69
See application file for complete search history.

(56) References Cited

U.S. PATENT DOCUMENTS

| | | |
|---|---|---|
| 3,204,035 A | 8/1965 | Ballard et al. |
| 3,795,765 A | 3/1974 | DeGroat et al. |
| 5,793,759 A | 8/1998 | Rakib et al. |
| 5,796,774 A | 8/1998 | Kato |
| 5,870,414 A | 2/1999 | Chaib et al. |
| 5,936,997 A | 8/1999 | Kanda |
| 5,938,787 A | 8/1999 | Stark et al. |
| 5,956,333 A | 9/1999 | Zhou et al. |

(Continued)

FOREIGN PATENT DOCUMENTS

| | | |
|---|---|---|
| CN | 101933277 | 12/2010 |
| CN | 101969319 | 2/2011 |

(Continued)

OTHER PUBLICATIONS

International Search Report and Written Opinion dated Oct. 14, 2022 from International Application No. PCT/US2022/035472.

(Continued)

*Primary Examiner* — Freshteh N Aghdam
(74) *Attorney, Agent, or Firm* — Beyer Law Group LLP

(57) ABSTRACT

A quadrature amplitude modulation (QAM) transmitter separates an input digital level into I and Q components. In a variation, a QAM transmitter uses every other input digital level as an I or Q component. A QAM receiver receives a QAM modulated signal and outputs digital levels. A QAM transmitter for transmitting analog levels uses a pair of input analog levels as the I and Q components. A QAM receiver receives a QAM modulated signal and outputs analog levels. The digital and analog input levels are produced by encoding N samples using L orthogonal codes.

22 Claims, 13 Drawing Sheets

16-QAM Constellation with Analog Mapping

(56) References Cited

U.S. PATENT DOCUMENTS

| | | | |
|---|---|---|---|
| 5,966,376 A * | 10/1999 | Rakib | H04W 48/16 370/479 |
| 6,018,547 A | 1/2000 | Arkhipkin | |
| 6,128,309 A | 10/2000 | Tariki et al. | |
| 6,154,456 A | 11/2000 | Rakib et al. | |
| 6,289,039 B1 | 9/2001 | Garodnick | |
| 6,310,923 B1 | 10/2001 | Lee et al. | |
| 6,363,100 B1 | 3/2002 | Ohki et al. | |
| 6,456,607 B2 | 9/2002 | Aria et al. | |
| 6,480,559 B1 | 11/2002 | Dabak et al. | |
| 6,614,861 B1 | 9/2003 | Terry et al. | |
| 6,751,247 B1 | 6/2004 | Zhengdi | |
| 6,763,009 B1 | 7/2004 | Bedekar et al. | |
| 6,956,891 B2 | 10/2005 | Tan et al. | |
| 7,027,102 B2 | 4/2006 | Sacca | |
| 7,710,910 B2 | 5/2010 | Ode et al. | |
| 7,793,022 B2 | 9/2010 | Travers et al. | |
| 7,796,575 B2 | 9/2010 | Lim et al. | |
| 7,873,097 B1 | 1/2011 | Luecke et al. | |
| 7,873,980 B2 | 1/2011 | Horan et al. | |
| 7,908,634 B2 | 3/2011 | Keady et al. | |
| 7,937,605 B2 | 5/2011 | Rea et al. | |
| 7,996,584 B2 | 8/2011 | Keady et al. | |
| 8,073,647 B2 | 12/2011 | Horan et al. | |
| 8,094,700 B2 | 1/2012 | Okazaki | |
| 8,272,023 B2 | 9/2012 | Horan et al. | |
| 8,280,668 B2 | 10/2012 | Horan et al. | |
| 8,295,296 B2 | 10/2012 | Keady et al. | |
| 8,369,794 B1 | 2/2013 | Bharghavan et al. | |
| RE44,199 E | 5/2013 | Garodnick | |
| 8,520,776 B2 | 8/2013 | Rea et al. | |
| 8,546,688 B2 | 10/2013 | Horan et al. | |
| 8,674,223 B2 | 3/2014 | Horan et al. | |
| 8,674,224 B2 | 3/2014 | Horan et al. | |
| 8,674,225 B2 | 3/2014 | Horan et al. | |
| 8,674,226 B2 | 3/2014 | Horan et al. | |
| 8,680,395 B2 | 3/2014 | Horan et al. | |
| 8,705,588 B2 | 4/2014 | Odenwalder | |
| 9,324,478 B2 | 4/2016 | Horan et al. | |
| 9,970,768 B2 | 5/2018 | Monroe et al. | |
| 10,158,396 B2 | 12/2018 | Hannebauer et al. | |
| 10,341,161 B2 * | 7/2019 | Gerdes | H04L 27/38 |
| 10,763,914 B2 | 9/2020 | Hannebauer et al. | |
| 11,025,292 B2 | 6/2021 | Hannebauer et al. | |
| 11,394,422 B2 | 7/2022 | Hannebauer et al. | |
| 11,463,125 B2 | 10/2022 | Hannebauer et al. | |
| 11,716,114 B2 | 8/2023 | Hannebauer | |
| 2002/0013926 A1 | 1/2002 | Kim et al. | |
| 2002/0097779 A1 | 7/2002 | Bang et al. | |
| 2002/0154620 A1 | 10/2002 | Azenkot et al. | |
| 2003/0139178 A1 | 7/2003 | Uesugi et al. | |
| 2004/0120415 A1 | 6/2004 | Song et al. | |
| 2005/0002441 A1 | 1/2005 | Rovini et al. | |
| 2005/0069020 A1 | 3/2005 | Lakkis | |
| 2005/0243956 A1 | 11/2005 | Fernald et al. | |
| 2007/0165729 A1 * | 7/2007 | Ha | H04L 27/2647 375/260 |
| 2008/0056357 A1 | 3/2008 | Chan et al. | |
| 2008/0084920 A1 | 4/2008 | Okazaki | |
| 2008/0106306 A1 | 5/2008 | Keady et al. | |
| 2010/0013579 A1 | 1/2010 | Horan et al. | |
| 2010/0061698 A1 | 3/2010 | Morello et al. | |
| 2010/0091990 A1 | 4/2010 | Etemad et al. | |
| 2010/0142723 A1 | 6/2010 | Bucklen | |
| 2010/0321591 A1 | 12/2010 | Onomatsu | |
| 2011/0044409 A1 | 2/2011 | Yoshimoto et al. | |
| 2011/0169870 A1 | 7/2011 | Yang et al. | |
| 2012/0014464 A1 | 1/2012 | Eiger et al. | |
| 2012/0047229 A1 | 2/2012 | Bennett | |
| 2013/0194284 A1 | 8/2013 | Bi | |
| 2014/0218616 A1 | 8/2014 | Toba et al. | |
| 2014/0340431 A1 | 11/2014 | Yamakawa | |
| 2016/0127087 A1 | 5/2016 | Feher | |
| 2018/0027257 A1 | 1/2018 | Izumi et al. | |
| 2019/0174027 A1 | 6/2019 | Lv et al. | |
| 2019/0260629 A1 | 8/2019 | Nikopour et al. | |
| 2019/0342564 A1 | 11/2019 | Kurokawa | |
| 2020/0014419 A1 * | 1/2020 | Hannebauer | H04B 1/707 |
| 2020/0043440 A1 | 2/2020 | Qiu et al. | |
| 2022/0302953 A1 | 9/2022 | Hannebauer et al. | |
| 2022/0397931 A1 | 12/2022 | Song et al. | |
| 2023/0223981 A1 | 7/2023 | Hannebauer | |
| 2023/0230559 A1 | 7/2023 | Friedman | |

FOREIGN PATENT DOCUMENTS

| | | |
|---|---|---|
| CN | 101917209 | 7/2015 |
| EP | 0727881 | 8/1996 |
| EP | 1079536 | 2/2001 |
| EP | 1968324 | 9/2008 |
| JP | 08293818 | 11/1996 |
| JP | H09312590 | 12/1997 |
| JP | 2001-144653 | 5/2001 |
| JP | 2001510658 | 7/2001 |
| JP | 2007-150971 | 6/2007 |
| WO | 97/02663 | 1/1997 |
| WO | 98/52365 | 11/1998 |
| WO | 2010/106330 | 9/2010 |
| WO | 2018-170546 | 9/2010 |
| WO | 2012/007785 | 1/2012 |
| WO | 2017/049347 | 3/2017 |

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.

Van der Heijden, "An Analog Correlator for a High Speed DS-CDMA Modem", Eindhoven University of Technology, Department of Electrical Engineering Telecommunication Technology and Electromagnetics, 1998, 65 pages.

Shanmugam et al., "An Analog Spread-Spectrum Interface for Power-Line Data Communication in Home Networking", IEEE transactions on Power Delivery, vol. 20, No. 1, Jan. 2005.

Immink, "Construction of DC-free Codes Using the fast Hadamard Transform", Nov. 7, 2001, 6 pages.

IEEE, An Analog Spread-Spectrum Interface for Power-Line Data Communication in Home Networking, Dated Jan. 2005.

* cited by examiner

16-QAM Constellation

QAM Transmitter

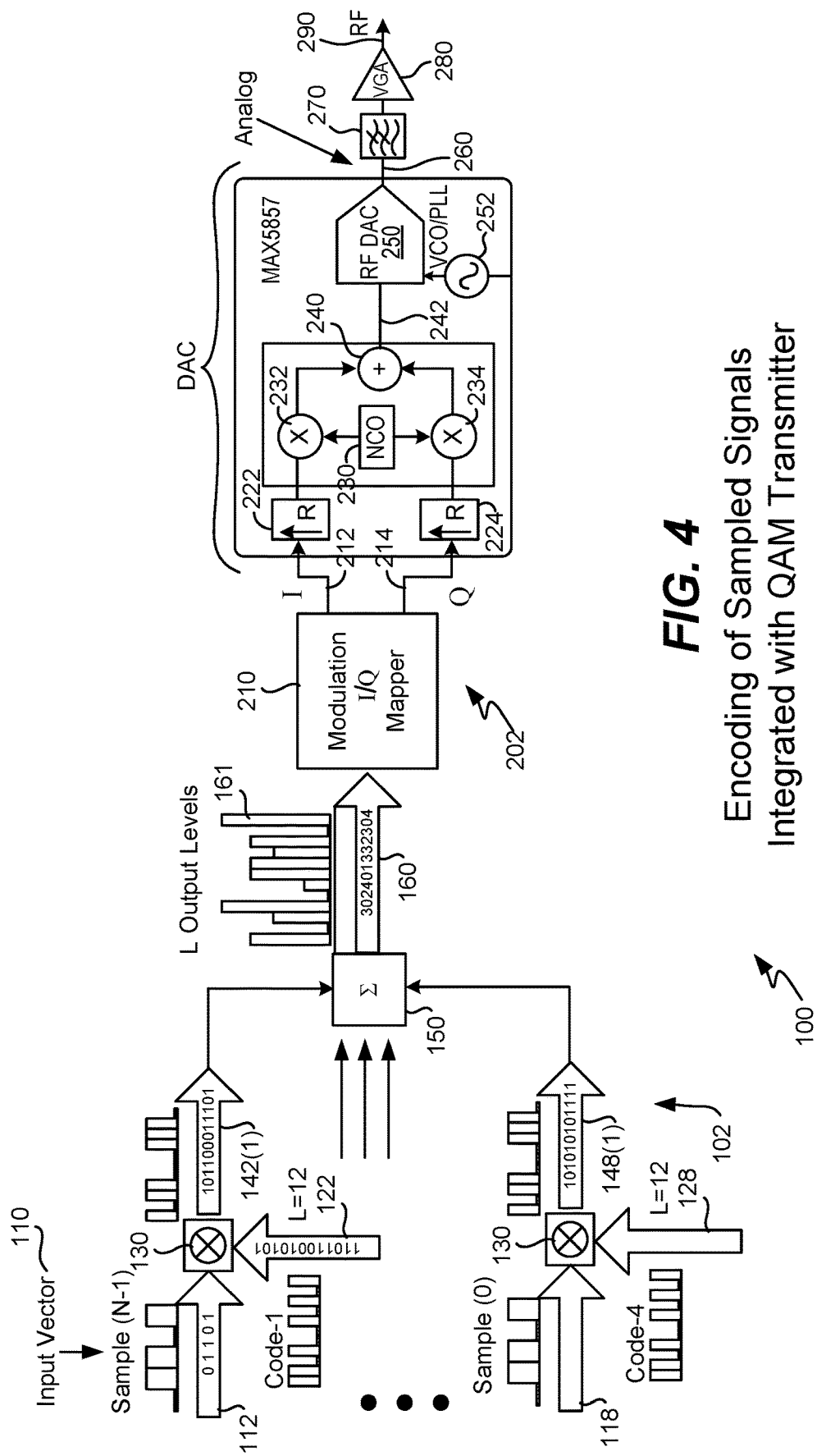
FIG. 4 Encoding of Sampled Signals Integrated with QAM Transmitter

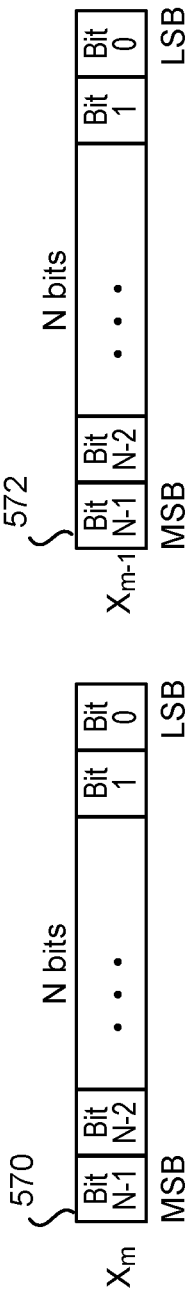
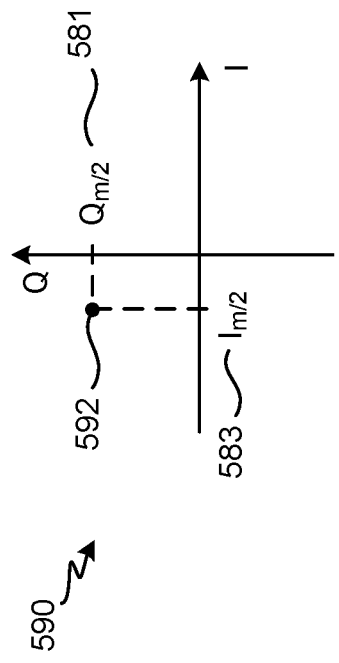
FIG. 6A
FIG. 6B

16-QAM Constellation with
Analog Mapping

Encoding of Sampled Signals Integrated with QAM Transmitter

Decoding Analog Input Levels

SPREAD-SPECTRUM VIDEO TRANSPORT WITH QUADRATURE AMPLITUDE MODULATION

CROSS-REFERENCE TO RELATED APPLICATIONS

This application claims priority of U.S. provisional patent application No. 63/220,587, filed Jul. 12, 2021, entitled "Method and System for Pulsital Communication" and of U.S. provisional patent application No. 63/318,204, filed Mar. 9, 2022, entitled "Spread-Spectrum Video Transport with Quadrature Amplitude Modulation," both of which are hereby incorporated by reference.

This application incorporates by reference U.S. application Ser. No. 15/925,123, filed on Mar. 19, 2018, now U.S. Pat. No. 10,158,396, issued Dec. 18, 2018, U.S. application Ser. No. 16/494,901 filed on Sep. 17, 2019, U.S. application No. 63/232,486 filed on Aug. 12, 2021, U.S. application Ser. No. 17/686,790, filed on Mar. 4, 2022, U.S. application No. 63/280,017, filed on Nov. 16, 2021, and U.S. application No. 63/317,746, filed on Mar. 8, 2022.

FIELD OF THE INVENTION

The present invention relates generally to the transport of sampled signals over electromagnetic pathways. More specifically, the present invention relates to combining quadrature amplitude modulation (QAM) with the transport of encoded signals, in particular encoded signals using a spread-spectrum video transport (SSVT) technique.

BACKGROUND OF THE INVENTION

Image sensors, display panels, and video processors are continually racing to achieve larger formats, greater color depth, higher frame rates, and higher resolutions. Video transport (whether within a sensor, device or display unit, within a constructed environment that surrounds people, or over much longer distances) necessarily involves the transport of media signals (such as video signals) over one or more electromagnetic (EM) pathways.

Due to such phenomena as attenuation, reflections due to impedance mismatches, and impinging aggressor signals, every EM path degrades EM signals that propagate through it, in the sense that measurements of an EM signal taken at a receiving terminal are certain to differ to some extent from the levels made available at a corresponding transmitting terminal. Therefore, every EM path may be considered an imperfect electromagnetic propagation pathway. The quality of any given EM path is characterized by the comparison of the levels measured at the receiving terminal after conveyance through the EM path to the levels made available at the transmitter.

U.S. Pat. No. 10,158,396 discloses systems and techniques for encoding analog or digital samples and transmitting those encoded samples over an electromagnetic pathway for the corresponding decoding and use of those samples. U.S. application Ser. No. 16/494,901 discloses systems and techniques for distributing and transmitting encoded samples over multiple electromagnetic pathways for eventual decoding and use, while U.S. application No. 63/232,486 filed on Aug. 12, 2021, discloses systems and techniques for the distribution, staging and permutation of samples before their encoding and transmission over one or more electromagnetic pathways (followed by the corresponding decoding, staging, permutation and collection of those samples). U.S. application Ser. No. 17/686,790 discloses a particular embodiment for the construction of a transmitter with encoders (and a receiver with decoders) for implementing transmission of encoded analog or digital samples over electromagnetic pathways. U.S. application Nos. 63/317,746 and 63/280,017 disclose respective transmitters and receivers within a display unit that use the SSVT technique to transport video.

Given that electromagnetic pathways are inherently imperfect and recognizing that the above disclosures use a particular technique for transmitting encoded samples over an electromagnetic pathway, additional techniques are desirable to improve upon the quality of the electromagnetic signals sent from a transmitting terminal to a receiving terminal.

SUMMARY OF THE INVENTION

To achieve the foregoing, and in accordance with the purpose of the present invention, a technique is disclosed that uses an improvement of quadrature amplitude modulation (QAM) to modulate encoded analog or digital samples for transmission from a transmitting terminal to a receiving terminal, and to demodulate a QAM signal into analog or digital samples.

In a first embodiment a transmitter encodes digital samples into digital output levels. These digital levels are mapped into QAM circuitry and output. In a variation, mapping circuitry distributes the MSBs and LSBs of each digital level into the MSBs and LSBs of the I and Q components, respectively. A corresponding receiver receives a QAM signal and produces the digital output levels (which may use the variation) which may then be decoded back into the original digital samples.

In a second embodiment a transmitter encodes analog samples into analog output levels. These analog levels are distributed into QAM circuitry and output. Switch circuitry distributes each pair of analog levels to the I and Q component. A corresponding receiver receives a QAM signal and produces the analog output levels which may then be decoded back into the original analog samples.

The invention is especially applicable to high resolution, high dynamic range displays used in computer systems, televisions, monitors, game displays, home theater displays, retail signage, outdoor signage, etc. In a particular embodiment, the invention is useful within such a display unit where it is used to transmit and receive video signals. By way of example, a transmitter of the invention may be used to implement the transmitter as described in U.S. application No. 63/317,746, and a receiver of the invention may be used to implement the receiver as described in U.S. application No. 63/280,017.

BRIEF DESCRIPTION OF THE DRAWINGS

The invention, together with further advantages thereof, may best be understood by reference to the following description taken in conjunction with the accompanying drawings in which:

FIG. 4 illustrates encoding of sampled signals integrated with a QAM transmitter.

FIG. 6A illustrates another embodiment of how digital samples may be mapped within a mapper.

FIG. 6B shows a graph showing how values represent a point on the complex QAM plane.

DETAILED DESCRIPTION OF THE INVENTION

As mentioned above, electromagnetic pathways are inherently imperfect. In order to identify how the quality of an electromagnetic signal degrades when transported from a transmitter to a receiver in the context of transmitting encoded analog or digital samples, and to improve upon that transport, the inventors of the present disclosure have made the following realizations.

Important in the transmission of encoded analog or digital samples is the signal-to-noise ratio (SNR) of the electromagnetic signal, especially over an electromagnetic path such as a cable. And, various degradation mechanisms have been identified that contribute to SNR degradation—crosstalk, attenuation, thermal noise and nonlinear distortion. With regard to crosstalk, especially over shielded cables, it is recognized that far-side crosstalk (FEXT) is especially problematic and is perceived as noise in a receiver. Further, and again with respect to cables such as Cat-5, Cat-6 or Cat-7, it is recognized that the SNR is frequency-dependent and becomes drastically lower at higher frequencies and at greater cable lengths. At these higher frequencies and longer cable lengths the signal becomes attenuated while crosstalk increases, both lowering the SNR. A second mechanism that degrades the SNR of an electromagnetic signal is thermal noise. Due to these effects, the attenuation of a signal in a cable brings the signal closer to a constant noise floor, again resulting in SNR degradation. A third mechanism that results in SNR degradation is nonlinear distortion. It is further realized that SNR degradation is also present in other channels such as wireless (radio links, e.g., point-to-point backhaul, LTE, Wi-Fi, etc.), optical, etc.

Thus, knowing that the SNR is important in transporting samples in the context of the present invention, the inventors have performed an analysis of possible modulation techniques for transporting those samples that would take advantage of the resiliency provided by SSVT thereby utilizing its resiliency to affect greater information density. One such modulation technique is quadrature amplitude modulation (QAM). Considering the encoding and transmission of digital or analog samples, it is realized that QAM in combination with SSVT will provide increased information density while using the increased electrical resiliency. Therefore, the inventors have concluded that integrating QAM with the encoding and transmission of analog and digital samples and improving upon QAM will provide important advantages.

In particular, QAM combined with an SSVT output will have advantages when using electromagnetic pathways such as cables and other media that have strong path length dependencies and non-linearities, and in noisy environments and systems requiring greater usage of the available bandwidths.

General QAM Transmitter

Figures 1, 2:
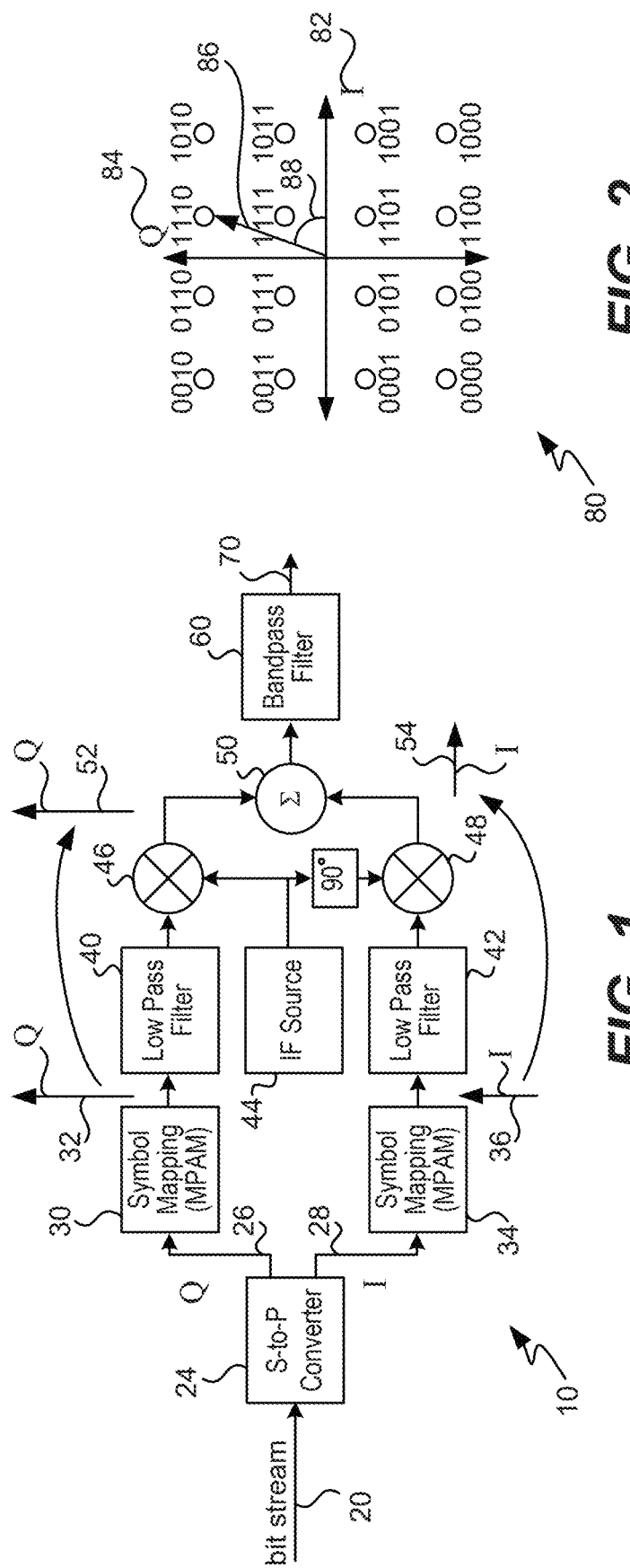
FIG. 1 illustrates a QAM transmitter.
FIG. 2 illustrates a 16-QAM constellation that may be used in conjunction with a QAM transmitter and shows how mapping may occur.

FIG. 1 illustrates a QAM transmitter 10. As is known in the art, a sinusoid with angle modulation can be synthesized from two amplitude-modulated sinusoids that are offset in phase by one quarter cycle (pi/2 radians); these amplitude-modulated sinusoids are known as the in-phase (I) and quadrature (Q) components. A bit stream 20 is input to the transmitter at a serial-to-parallel converter 24 which converts the bit stream into groups of bits representing digital values, e.g., if the digital values to be modulated are four bits long then converter 24 converts the bit stream into groups of four bits each. For purposes of QAM modulation, each group is split, two bits being routed on the Q path 26 to a symbol mapping unit 30, and two bits being routed on an I path 28 to a symbol mapping unit 34. MPAM stands for "M-array PAM," meaning that the I and Q paths are each modulated as an M-array PAM to produce the X (I) and Y (Q) axis mapping for each constellation point in the QAM constellation.

Mapping unit 30 produces the Q component 32 while mapping unit 34 produces the I component 36. The Q and I components (I and Q being real signals, the pair {I,Q} being a complex signal) are each passed through a low pass filter 40, 42 to limit the signal bandwidth. Next, IF source 44 (basically a numerically-controlled oscillator) takes the in-phase component and the quadrature component and multiplies each signal by its amplitude, placing the quadrature component 90° out of phase, and then adding both together in a summer 50. The output of summer 50 will be a real signal representing the original digital value input into the transmitter. Depending upon the implementation, a DAC may be added after summer 50 or two DACs may be used, one each on the Q and I paths after mapping 30 and 34. Finally, a bandpass filter 60 may be used to filter unwanted spurs and harmonics in order to output the QAM signal 70 representing bit stream 20.

FIG. 2 illustrates a 16-QAM constellation 80 that may be used in conjunction with transmitter 10 and shows how mapping may occur. In a 16-QAM constellation digital values are four bits each. In this example, consider that the input digital value is "1110." Mapping this digital value using constellation 80 results in the vector as shown having an amplitude 86 and a phase 88. Of course, other constellations of larger size may also be used.

Specific QAM Transmitter Embodiment

Above is described a general QAM transmitter. As mentioned above, it is realized that QAM may be used to modulate and transmit encoded output values using various improvements to the QAM transmitter. Depending upon the implementation, QAM constellations of different sizes may be used.

Figure 3:
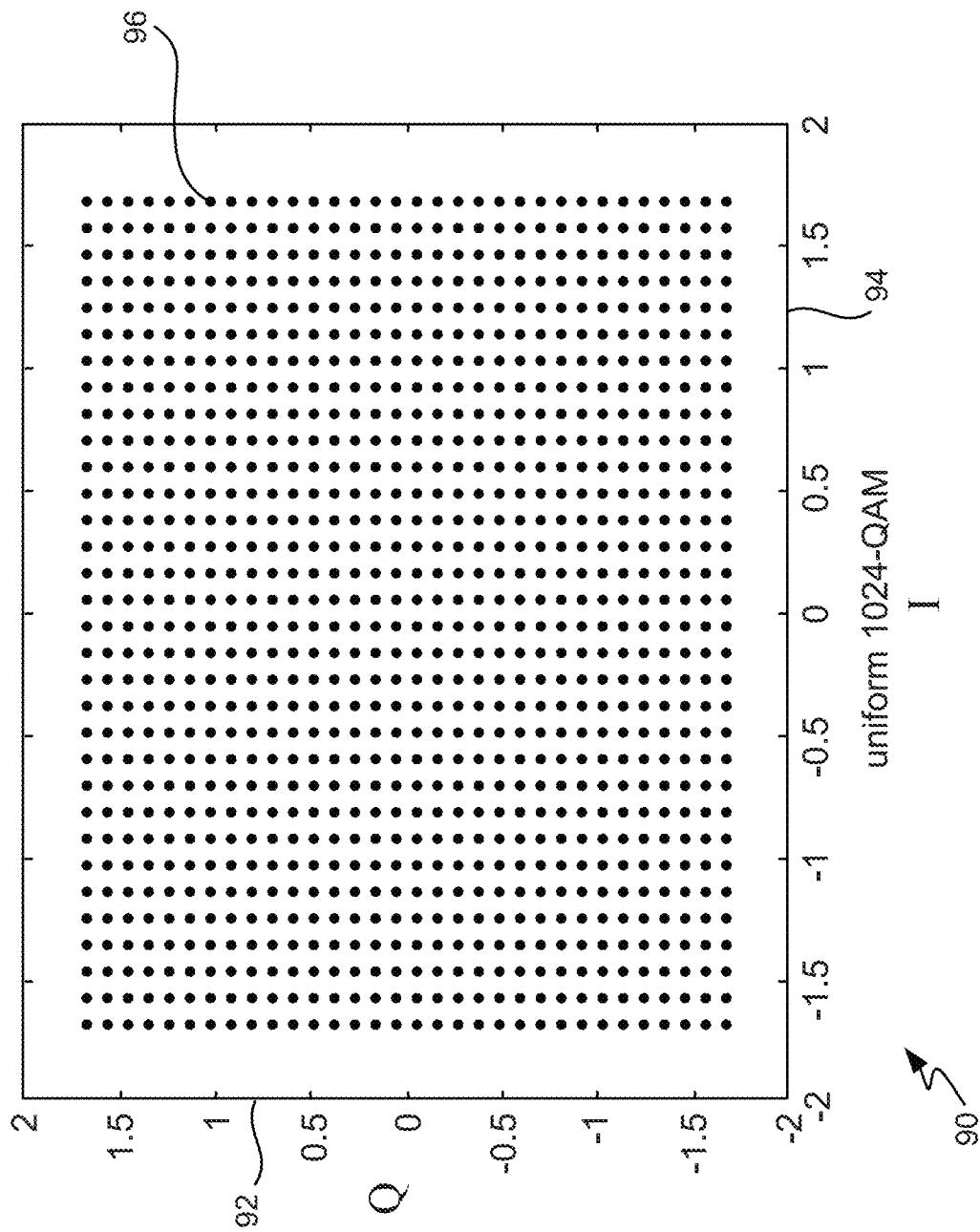
FIG. 3 illustrates a 1024-QAM constellation having a Q axis and an I axis.

FIG. 3 illustrates a 1024-QAM constellation 90 having a Q axis 92 and an I axis 94. Each of the digital values 96 within this constellation will be 10 bits long. Most common QAM constellation sizes can be calculated as $4^n$: 4-QAM, 16-QAM, 64-QAM, 256-QAM, 1024-QAM and 4096-QAM. Higher QAM constellation sizes are rarely used. Other $2^n$ QAM constellations do exist but are more complicated to encode and cannot use a separate encoding for I and Q paths.

FIG. 4 illustrates encoding of sampled signals integrated with a QAM transmitter 100. As described in U.S. Pat. No. 10,158,396 and in U.S. patent application Ser. No. 16/494,901, an input vector 110 including any number of digital or analog samples is encoded within an encoder using codes from a code book in order to produce L output levels 160 for transmission over an electromagnetic pathway. Further description of this encoding technique may be found below in FIGS. 8, 10 and 11. In this example, the samples are digital values, digital encoding is used, and output levels 160 are digital values. As will be described in greater detail below, analog samples, analog encoding and analog output levels may also be used.

Shown is an encoder 102 and a QAM transmitter 202. Input vector 110 includes N samples 112-118. In this example, each sample is 5 bits long and sample 112 has the value "01101." There are N codes 122-128, each code corresponding to one of the samples, each code having a length of L chips and each being orthogonal to the other. To perform the encoding, each chip of the code corresponding to a particular sample modulates 130 that sample thus producing L modulated values for each sample. In this simple example, modulation of sample 112 by the first chip of code 122 results in the modulated value 142(1). Modulating each sample by the first chip of its corresponding code results in modulated values 142(1)-148(1). These modulated values 142(1)-148(1) are then summed 150 to produce the first digital output level 161. The other modulated values 142(2:L)— 148(2:L) are then summed in a similar fashion to produce the rest of output levels 160. This stream of digital output levels is then mapped using a suitable QAM constellation and quadrature amplitude modulation is used in order to produce a QAM analog output 290 as will now be described.

Output levels 160 may have any suitable bit length; in one embodiment, the length of each output level is 10 bits. Accordingly, a 1024-QAM (e.g., for every number of bits, n, a $2^n$ QAM will be used) constellation will be used to perform the mapping of these values for use in the QAM transmitter. Improvement to mapping is explained in greater detail below.

Components 222 and 224 are interpolation filters that may be used to increase the sampling rate of the input signal. Elements 232 and 234 are frequency conversion components that provide an upconverter of frequency from a baseband signal. NCO 230 is a numerically-controlled oscillator that basically interacts with converters 232 and 234 in order to create the in-phase in quadrature components, which are summed together at 240 in order to produce a real output signal 242 that represents each of the input output levels 160 in turn. Signal 242 is input into a DAC 250 outputting analog signal 260 which passes through a bandpass filter 270 before being amplified for transmission 290 over an electromagnetic pathway by variable gain amplifier (VGA) 280. Components 222-250 may be embodied within a MAX5857 RF DAC (includes a clock multiplying PLL/VCO 252 and a 14-bit RF DAC core). A real sample is input every clock cycle having the amplitude and phase derived from the constellation map. This implementation of FIG. 4 assumes that the DAC is clocked at a high frequency which is higher or close to the RF frequency. In an alternative embodiment, instead of a single DAC 250, there will be two DACs one each on the I and Q paths.

Although output 290 is shown as an RF output, output over other types of electromagnetic pathways such as cables and optic fiber are also possible.

In addition, because of imperfections with transmission over a cable (such as frequency attenuation, phase shifts, etc.), a preamble (or training sequence) will be added into the stream of samples to help the receiver synchronize. The preamble is a known signal to be detected and is used as a channel estimation by the receiver. Preferably a switch is used before the input to the QAM modulation that inserts a preamble as needed.

In another more conventional implementation (not shown), referring back to FIG. 1, there are DACs on both the I and Q paths (immediately before low pass filters 42 and 40) and the subsequent blocks are implemented in analog. This implementation requires a much lower sampling rate and may use less expensive components. The implementation of FIG. 4, though, may be preferred as it is a cleaner implementation.

Mapping Digital Values

Modulation I/Q mapper 210 performs symbol mapping and mapping may be performed in any suitable manner using circuit techniques known in the art. Mapper 210 includes mapping circuitry that maps incoming digital levels in an improved manner as described below. In one embodiment, for each output level from an encoder, the lower half bits are sent via the Q path 214 while the upper half of the bits are sent via the I path 212. In another embodiment, every odd-numbered output level is sent via path 212 while every even-numbered output level is sent via path 214. In another embodiment, if each digital output level is 12 bits long and a 16-QAM is used, then that value is divided up into three groups of four bits each, each group divided into I and Q values of two bits each. In another mapping embodiment gray coding may be used. For digital data, gray coding is used to lower the probability of multiple bits errors. Gray coding implies that coding of neighboring constellation points will differ by only one bit.

In one preferred embodiment, the most significant bits (MSBs) of each digital output level from an encoder are divided between and become the MSBs of the I and the Q paths while the least significant bits (LSB's) of each digital output level are divided between and become the LSBs of the I and the Q paths. By way of example, considering that a digital output level is the four-bit binary string [ABCD], each of the letters A, B, C, D representing a single binary digit (e.g., a "1" or a "0"), AB representing the most significant bits and CD representing the least significant bits, these four bits will be distributed as follows between the I and the Q paths: I=AC, Q=BD. Thus, the most significant bits of the digital output level become the most significant bits on the I and the Q paths while the least significant bits of the digital output level become the least significant bits on the I and Q path.

The reason for this distribution is due to the realization that if there is noise or other disturbance along a transmission medium the received QAM signal may be slightly distorted and the least significant bits may be lost. But, as the digital output levels of the present invention may represent a media signal (e.g., pixel values from a camera source), it is not strictly necessary that each and every bit be perfectly preserved from transmitter to receiver. Contrast that with transmission of digital data (such as a document) between computers where every bit transmitted must be perfectly preserved and sophisticated error detection is required. In other words, the QAM receiver is less sensitive to errors on the LSBs than to errors on the MSBs. Thus, this distribution provides better protection for the MSBs compared to the LSBs. Unlike digital data transmission where each bit is critical, not all bits in this distribution have the same weight; the closer the bit location is to the MSB the more important it is. Therefore, by dividing the MSB's and the LSB's of each digital output level between the I and the Q paths, if the received QAM signal is distorted and received incorrectly, it is only the LSB's of the original digital output level that will be lost. Loss of LSBs in a received media signal is not catastrophic.

Figure 5A:
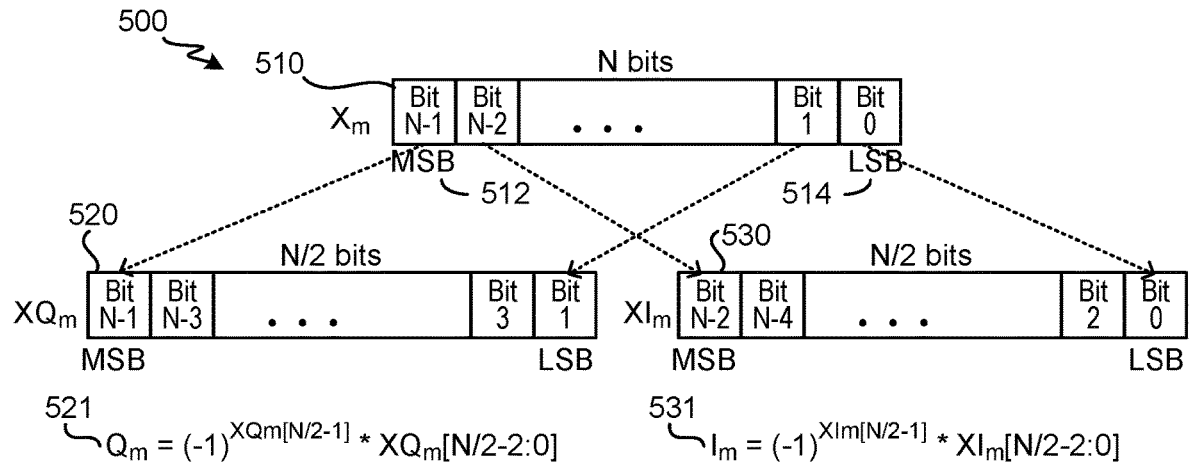
FIG. 5A illustrates an embodiment of how division of MSB's and LSB's may occur within a mapper.

FIG. 5A illustrates an embodiment 500 of how this division of MSB's and LSB's may occur within mapper 210. Assuming a digital output level $X_m$ 510 is represented by N bits, 510 having any number of MSB bits 512 and any number of LSB bits 514, the MSB bits being half or roughly half the total number of bits. Then, assuming that N is even, the digital level can be divided into two digital values, $XI_m$ 530 and $XQ_m$ 520, by selecting the even and odd bits, the even-numbered bits (including 0) assigned to value 530 and the odd-numbered bits assigned to value 520. Each one of the new digital values, $XI_m$ and $XQ_m$, may further be converted into a binary representation of a signed value where the MSB of each value becomes the sign of the value and the remaining bits become the amplitude of the value. The resulting values 531 and 521 are then used as the values for the I and Q path respectively in the complex QAM plane. Of course, the even-numbered bits may be assigned to value 520 and the odd-numbered bits assigned to value 530.

Even though in the above scheme the MSB for each digital value becomes the sign bit, the value represented by the MSB is not lost. The idea is that values "closer" to each other, for example values of −1 and 0, are mapped to very close constellation points. Even though the MSB is not the same for both values, if there is a mistake between the two values there will only be an error of "1" which is the smallest possible error for an "analog" sample.

Other techniques for creating signed values from values 520 and 530 are also possible. By way of example, another way to map a value to a constellation point instead of mapping the MSB to the sign bit may be performed by taking an unsigned value and subtracting an offset which is the median value between the minimum and maximum value.

Figure 5B:
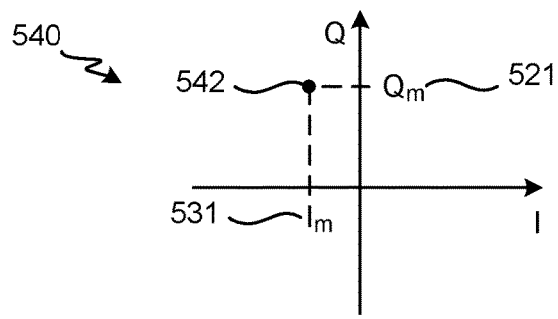
FIG. 5B shows a graph showing how values represent a point on the complex QAM plane.

FIG. 5B shows a graph 540 showing how values 521 and 531 represent point 542 on the complex QAM plane.

Figure 5C:
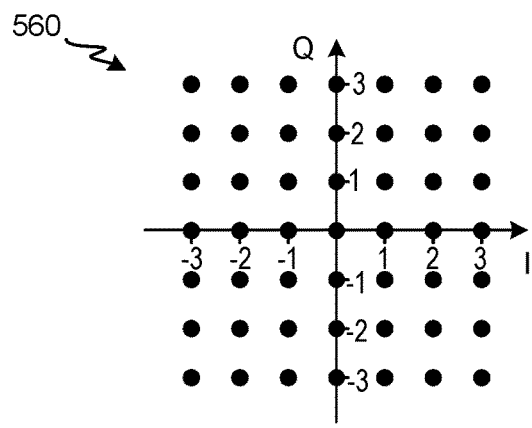
FIG. 5C shows an example QAM constellation.

FIG. 5C shows an example QAM constellation 560. Note that since the number of bits used to represent XIm and XQm is finite, the number of actual values Im and Qm may have is also finite. In this example, the original digital level 510 has 6 bits, thus there are 3 bits each representing Im and Qm, the first bit being the sign bit, meaning that values for each range from −3 to 3 as shown in the constellation. This constellation may thus be used to map XIm and XQm into I and Q values for the I and Q paths of a QAM transmitter.

FIG. 6A illustrates another embodiment of how digital levels may be mapped within mapper 210. Here, the even and odd digital levels $X_{m-1}$ and $X_m$, are each mapped directly to the I and Q components using the same binary representation to map the digital levels to the QAM plane. Again, the MSB of each is treated as a sign bit. Assuming an input digital level $X_m$ 570 and subsequent digital level $X_{m-1}$ 572 are each represented by N bits. The resulting values 581 and 583 are then used as the values for the I and Q path respectively in the complex QAM plane.

FIG. 6B shows a graph 590 showing how values 581 and 583 represent point 592 on the complex QAM plane.

Quadrature Amplitude Modulation Using Analog Inputs

Figure 10:
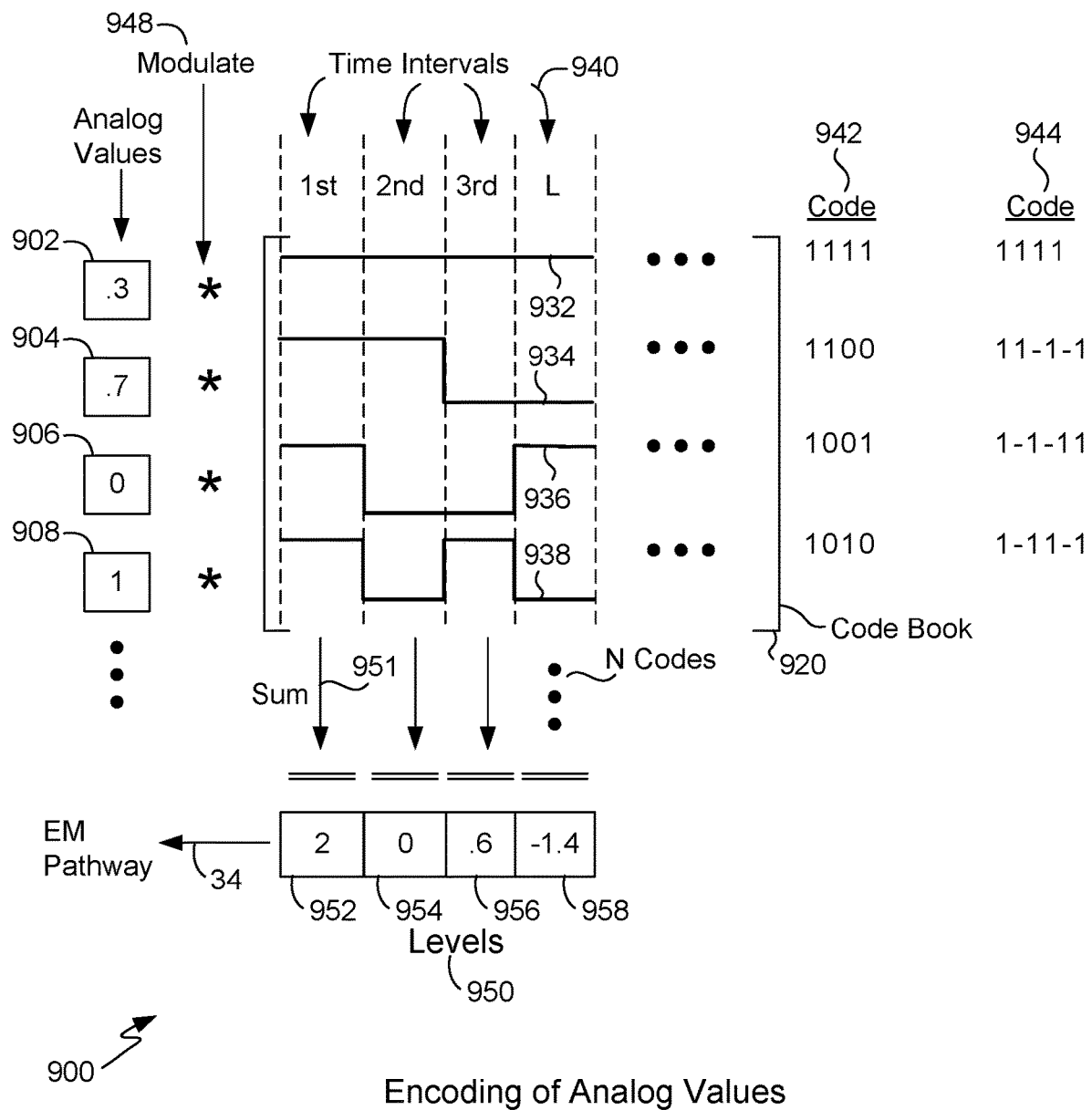
FIG. 10 illustrates an example showing how signal samples, in this case, analog values, are encoded within an encoder and then sent over an electromagnetic pathway.
Figure 14:
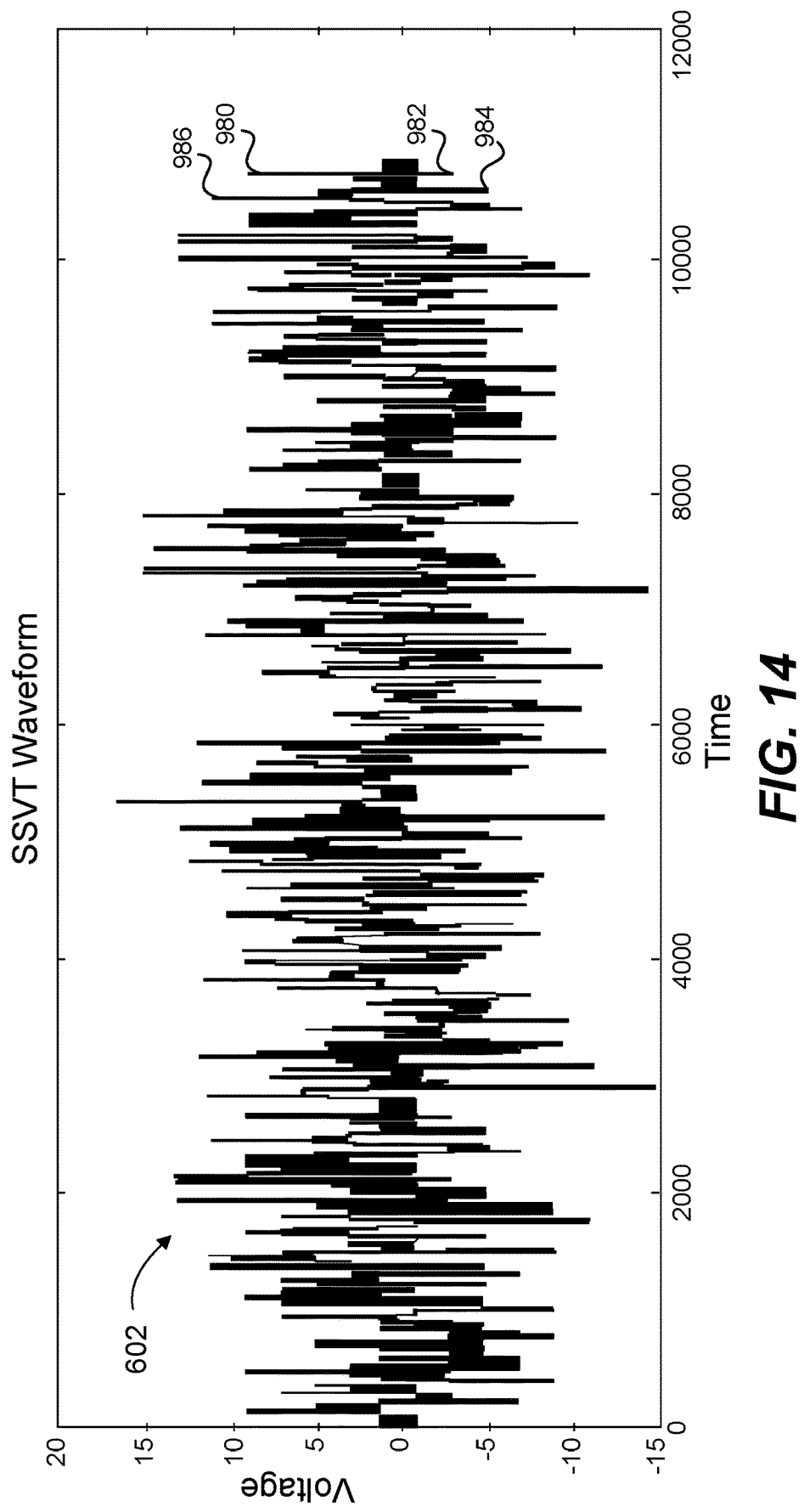
FIG. 14 shows a simulation of an SSVT waveform sent via an electromagnetic pathway.

As mentioned earlier, and as described herein in FIG. 10 and in other locations, instead of encoding digital samples as shown in the input vector 110 of FIG. 4, one embodiment of the invention may encode analog samples and produce analog output levels. Accordingly, the L output levels 160 will be analog levels and may appear, for example, as shown in the waveform of FIG. 14. This embodiment of the invention is also able to modulate and transmit these L analog output levels using an improvement to quadrature amplitude modulation (QAM) as will now be described. As shown in FIG. 10 (and elsewhere), the analog levels can be positive or negative. These levels do not change how the mapping is performed. In the digital case, the idea behind setting the MSB as the sign bit was exactly that, to map an "unsigned" value to a value that can be positive or negative.

Figure 7:
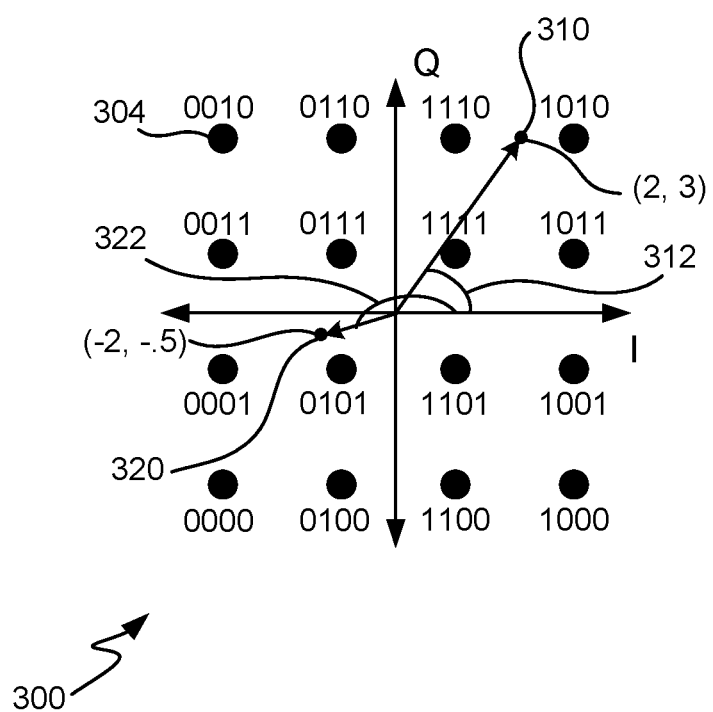
FIG. 7 illustrates a constellation mapping that is useful in describing how QAM may use sampled analog input levels.

FIG. 7 illustrates a constellation mapping 300 that is useful in describing how QAM may use analog output levels from an encoder as inputs. Although this constellation still shows sixteen digital values 304, a mapping to these values is not used and these values are only shown to help the reader understand how analog levels are input. Although it is possible to convert a series of L analog output levels from an encoder into digital output levels and then input these digital levels into a QAM transmitter as shown in FIG. 4, this embodiment of the invention can use the analog output levels directly. In other words, the analog output levels themselves can represent the in-phase (I) and out-of-phase (Q) components directly.

Figure 9:
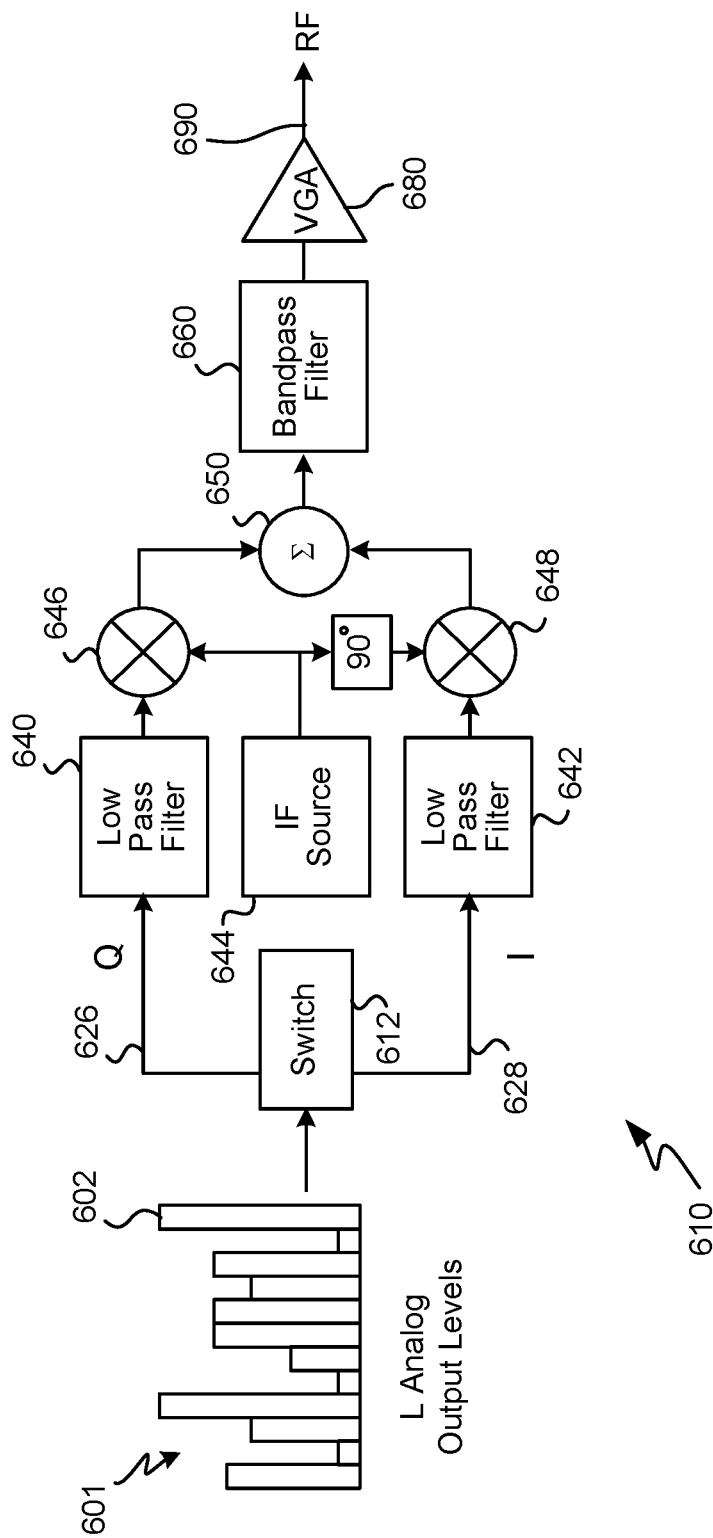
FIG. 9 illustrates encoding of sampled signals integrated with a QAM transmitter that uses analog input values.

FIG. 9 illustrates encoding of sampled signals integrated with a QAM transmitter 610 that uses analog input values. Shown are L analog output levels 601 from an encoder that are input into the QAM transmitter 610.

Switch device 612 performs a sample and hold function to present alternately sampled (odd, even) of the received analog levels as time-aligned pairs down the Q path 626 and the I path 628 simultaneously. Thus, every two analog levels will produce an {I,Q} pair. This time alignment is necessary to ensure that the serially-presented analog levels modulate in the constellation simultaneously. Switch 612 may be any suitable hardware device used to select the destination of every level and to distribute these levels down either path. In a corresponding QAM receiver, switch 612 is replaced by a combining device or circuitry that accepts the {I,Q} pair and produces the two analog levels.

The Q and I components (I and Q being real signals, the pair {I,Q} being a complex signal) are each passed through a low pass filter 640, 642 to limit the signal bandwidth. Next, IF source 644 (basically a numerically-controlled oscillator) takes the in-phase component and the quadrature component and multiplies each signal by its amplitude (this being the amplitude of the NCO and NCO shifted by 90 degrees), placing the quadrature component 90° out of phase, and then adding both together in a summer 650. The output of summer 650 will be a real signal (this real signal is also called the passband signal which is the baseband signal shifted to the frequency of the NCO) representing the original two, consecutive analog values input into the transmitter. A bandpass filter 660 may be used to filter unwanted spurs and harmonics, and finally a variable gain amplifier 680 (similar to amplifier 280 from FIG. 4) is used to amplify and to output the QAM signal 690 representing the original continuous input of analog output levels 601 from an encoder.

By way of example, consider that given a series of L analog output levels 601 the odd-numbered values will be placed upon the I path 628 and the even-numbered values will be placed upon the Q path 626. Of course, the odd-numbered values may be placed upon the Q path and the even-numbered values placed upon the I path. Thus, the I and Q components can each represent different analog output levels. Using output levels 601 as an example, the first analog output level 602 will be placed on the I path, the second level is placed on the Q path, the third level placed on the I path, etc. Returning to FIG. 7 in order to illustrate examples, consider that the first analog level is "2" and the second analog level is "3." Conceptually, these two values (I,Q) may be mapped to the point 310 producing the vector as shown having a specific amplitude and a phase 312. Next, consider that the third analog level is "−2" and that the fourth analog level is "−0.5". Similarly, these two values may be mapped to the point 320 producing the vector as shown having a specific amplitude and a phase 322. In this fashion, a series of L analog output levels 601 may be input into a QAM transmitter 610 in order to produce RF signal 690. Although output 690 is shown as an RF output, output over other types of electromagnetic pathways such as cable and optic fiber are also possible.

In fact, although FIG. 7 shows a QAM constellation, mapping of each analog level into a constellation is not required because each analog level may be used directly to provide the I and Q values; the amplitude and phase of the resultant vector is determined using the I and Q values as shown.

Other techniques for directly mapping and using the analog output levels are also possible. In the case of analog samples, it is useful to minimize the amplitude of the error. Thus, mapping the even-numbered samples and odd-numbered samples to I and Q separately makes sense. Gray coding may not be suitable since for analog samples the lower bits of each sample have lower weight and are less important than the higher bits. Therefore, the odd-numbered levels may be sent down the Q path 214 and the even-numbered levels may be sent down the I path 212, or vice versa.

QAM Receiver and Demodulation

Above have been described embodiments for a quadrature amplitude modulation (QAM) transmitter and embodiments for inputting and mapping L digital output levels from an encoder and for inputting and distributing L analog output levels from an encoder in order to send a QAM signal to a receiver. One of skill in the art, upon a reading of this disclosure, will find it straightforward to implement a corresponding QAM demodulator and receiver that accepts the QAM radio frequency signal and outputs the L digital output levels or the L analog output levels as the case may be, using the conventions used in the corresponding QAM transmitter relating to the digital mapping technique used or the analog distribution technique used.

Spread Spectrum Video Transport (SSVT) Signal

As mentioned earlier, various embodiments of the present invention disclose that an analog signal be used to transport video information either locally (e.g., within a display unit) or over longer distances. For the purposes of this disclosure, an electromagnetic signal (EM signal) is a variable represented as electromagnetic energy whose amplitude changes over time. EM signals propagate through EM paths, such as a wire pair (or cable), free space (or wireless), and optical or waveguide (fiber), from a transmitter terminal to a receiver terminal. EM signals can be characterized as continuous or discrete independently in each of two dimensions, time and amplitude.

The present disclosure makes use of a novel discrete-time, continuous-amplitude EM signal termed a "spread-spectrum video transport" (SSVT) signal that is an improvement over existing SSDS-CDMA signals. SSVT refers to the transmission of electromagnetic (EM) video signals to a video sink over an EM pathway or pathways using the novel techniques disclosed herein.

Code Division Multiple Access (CDMA) is a well-known channel access protocol that is commonly used for radio communication technologies, including cellular telephony. CDMA is an example of multiple access, wherein several transmitters can send information simultaneously over a single communication channel. In telecommunications applications, CDMA allows multiple users to share a given frequency band without interference from other users. CDMA employs Spread Spectrum Direct Sequence (SSDS), encoding which relies on unique codes to encode each user's data. By using unique codes, the transmission of the multiple users can be combined and sent without interference between the multiple users. On the receive side, the same unique codes are used for each of the multiple users to demodulate the transmission, recovering the data of each user respectively. SSVT is different from CDMA as will be explained in greater detail below.

SSVT Transmitter Distributor/Encoder

Figure 8:
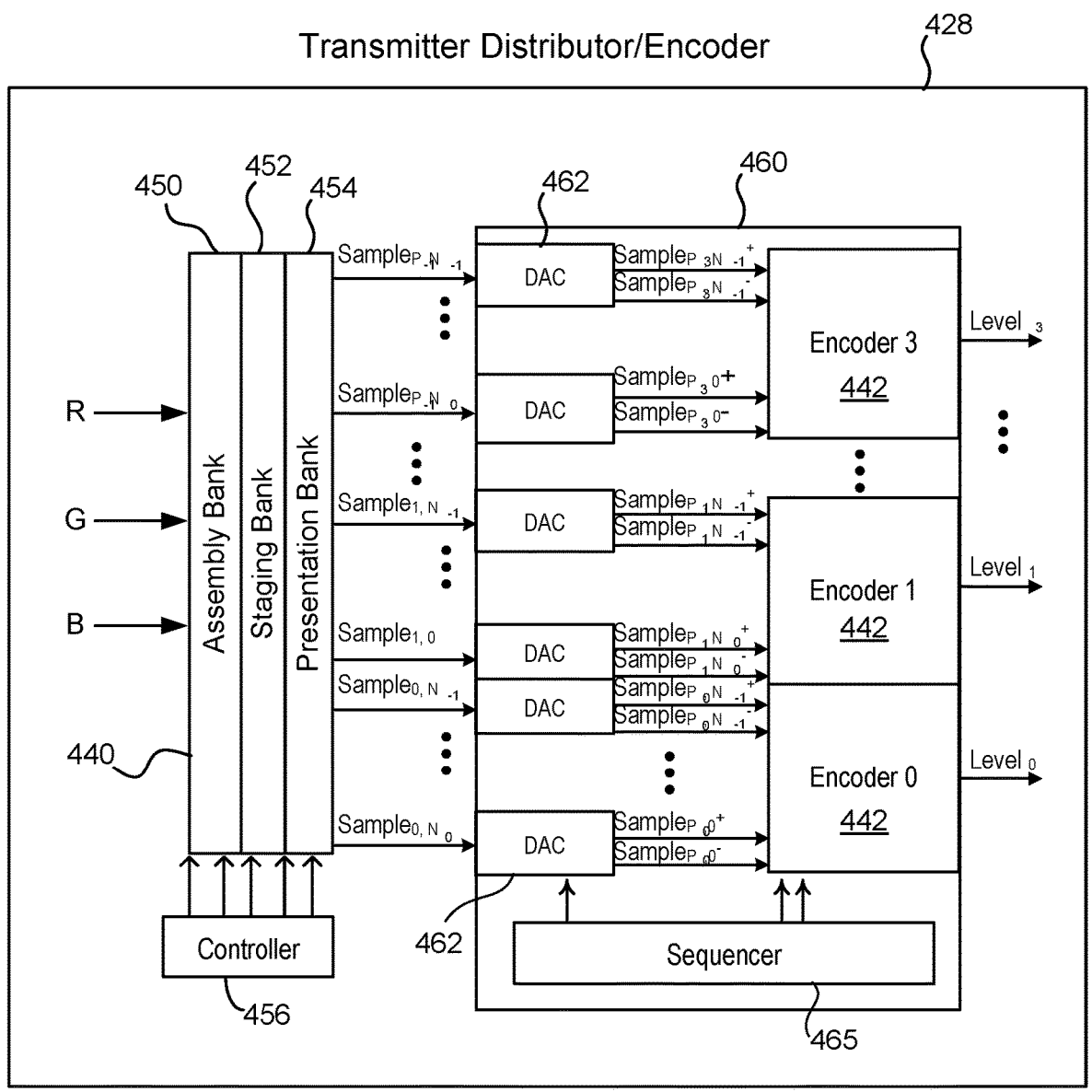
FIG. 8 illustrates a logic block diagram of an SSVT transmitter.

FIG. 8 illustrates a logic block diagram of an SSVT transmitter 428. The distributor 440 includes an assembly bank 450, a staging bank 452, a presentation bank 454 and a controller 456. An encoder block 460 includes a bank of digital-to-analog converters (DACs) 462 and four encoders 442, one for each EM pathway of a transmission medium. As mentioned herein, a stream of samples from a single source (such as a camera, image sensor, another sensor, etc.) arrives at transmitter 428 for encoding. Each encoder 442 encodes one input vector, such as input vector 110 of FIG. 4 and produces a series of output levels, such as output levels 160. Accordingly, there may be any number (P) of encoders 102 and corresponding QAM transmitters 202 as shown in FIG. 4, one encoder and QAM transmitter per EM pathway.

The distributor 440 is arranged to receive the exposed color information (e.g., RGB) for the stream of sets of samples, one after the other. In response, the assembly bank 450 builds the four vectors $V_0$, $V_1$, $V_2$ and $V_3$ from the exposed color information (e.g., RGB) for the incoming stream of sets of samples. As the sets of samples are received, they are stored in the assembly bank 450 according to a predetermined permutation. The distributor 440 may use any number of different permutations when building the vectors containing N samples each.

The staging bank 452 facilitates the crossing of the N samples of each of the four vectors $V_0$, $V_1$, $V_2$ and $V_3$ from a first clock frequency (or first timing domain) used by a retimer into a second clock frequency (or second domain) used for the encoding and transmission of the resulting EM output levels over the transmission medium. Using the example with N=60 and S=3, the samples representing exactly 80 sets of RGB samples are contained in the four encoder input vectors $V_0$, $V_1$, $V_2$ and $V_3$.

In various embodiments, the first clock frequency can be faster, slower or the same as the second clock frequency. The first clock frequency f_pix is determined by the video format selected by a video source. The second clock frequency f_ssvt is a function of f_pix, the number P of EM pathways in the transmission medium, the number S of samples in each set of input/output samples, and the SSVT transform parameters N (the number of input/output vector locations) and L (the length of each SSDS code), where f_ssvt= (f_pix*S*L)/(P*N). With this arrangement, the input clock (pix_clk) oscillates at one rate, and the SSVT clock (ssvt_clk) oscillates at another rate. These rates can be the same or different. The encoder performs the encoding while the next input vector is prepared. The presentation bank 54 presents the N samples of each of the four encoder input vectors $V_0$, $V_1$, $V_2$ and $V_3$ to the encoder block 60 (e.g., vector $V_0$ includes $Sample_{0,0}$ through $Sample_{0,N-1}$)

Controller 456 controls the operation and timing of assembly bank 450, the staging bank 452, and the presentation bank 454. In particular, the controller is responsible for defining the permutation used and the number of samples N when building the four encoder input vectors $V_0$, $V_1$, $V_2$ and $V_3$. The controller 456 is also responsible for coordinating the clock domain crossing from the first clock frequency to the second clock frequency as performed by the staging bank 452. The controller 456 is further responsible for coordinating the timing of when the presentation bank 454 presents the N samples of each of the encoder input vectors $V_0$, $V_1$, $V_2$ and $V_3$ to the encoder block 460.

Within the encoder block 460, a plurality of digital-to-analog converters (DACs) 462 is provided, each arranged to receive one of the P*N samples ($Sample_{0,0}$ through $Sample_{P-1,N-1}$) assigned to the four encoder input vectors $V_0$, $V_1$, $V_2$ and $V_3$ collectively. Each DAC 462 converts its received sample from the digital domain into a differential pair of voltage signals having a magnitude that is proportional to its incoming digital value. The output of the DACs 462 may range from a maximum voltage to a minimum voltage.

The four encoders 442 are provided for the four encoder input vectors $V_0$, $V_1$, $V_2$ and $V_3$ respectively. Each encoder 442 receives the differential pair of signals for each of the N samples for its encoder input vector, modulates each of the N differential pair of voltage signals using chips from a code corresponding to each sample, accumulates the modulated values and then generates a differential EM level output level. Since there are four encoders 442 in this example, there are EM level signals ($Level_0$ through $Level_3$) that are simultaneously transmitted over the transmission medium.

A sequencer circuit 465 coordinates the timing of the operation of the DACs 462 and the encoders 442. The sequencer circuit 465 is responsible for controlling the clocking of the DACs 462 and the encoders 442. The sequencer circuit 465 is also responsible for generating two clock phase signals, "clk 1" and "clk 2", that are responsible for controlling the operation of the encoders 442.

A receiver corresponding to transmitter 428 may be used to receive the output levels, decode, and collect the samples into RGB signals, as will be appreciated by one of skill in the art upon a reading of this disclosure. This example shows analog encoding, but digital encoding (and decoding) may also be used. DACs or ADCs may precede or follow the encoders (or decoders) as the case may be and as required by an implementation.

SSVT Signal, Encoding and Decoding

As mentioned above, various embodiments of the present invention disclose that encoded output levels (analog or digital)—an SSVT signal—are input into a QAM transmitter, or that a QAM receiver receives a QAM-modulated signal and produces an SSVT signal for decoding. The below describes that SSVT signal in more detail and provides its advantages.

For the purposes of this disclosure, an electromagnetic signal (EM signal) is a variable represented as electromagnetic energy whose amplitude changes over time. EM signals propagate through EM paths, such as a wire pair (or cable), free space (or wireless) and optical or waveguide (fiber), from a transmitter terminal to a receiver terminal. EM signals can be characterized as continuous or discrete independently in each of two dimensions, time and amplitude. "Pure analog" signals are continuous-time, continuous-amplitude EM signals; "digital" signals are discrete-time, discrete-amplitude EM signals; and "sampled analog" signals are discrete-time, continuous-amplitude EM signals. The present disclosure discloses a novel discrete-time, continuous-amplitude EM signal termed a "spread-spectrum video transport" (SSVT) signal that is an improvement over existing SSDS-CDMA signals. SSVT refers to the transmission of electromagnetic signals over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel. In telecommunications applications, CDMA allows multiple users to share a given frequency band without interference from other users. CDMA employs Spread Spectrum Direct Sequence (SSDS) encoding which relies on unique codes to encode each user's data. By using unique codes, the transmission of the multiple users can be combined and sent without interference between the users. On the receive side, the same unique codes are used for each user to demodulate the transmission, recovering the data of each user respectively.

An SSVT signal is different from CDMA. As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying the corresponding SSDS-based demodulation in order to reconstruct the samples that were encoded. As a result, the original stream of time-ordered video samples containing color and pixel-related information is conveyed from a single video source to a single video sink, unlike CDMA which delivers data from multiple users to multiple receivers.

FIG. 10 illustrates a simplistic example showing how signal samples, in this case, analog values, are encoded within an encoder and then sent over an electromagnetic pathway. Shown is an input vector of N analog values 902-908 which represent voltages of individual pixels within a video frame. These voltages may represent luminosity of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc., and the analog values may represent other samples such as current, etc. Signal samples that are digital values may also be encoded and this digital encoding is explained below. Further, even though one encoder and one EM pathway is shown, an embodiment of the invention works well with multiple encoders, each transmitting over an EM pathway.

Preferably, the range of these voltages is from 0 to 1 V for efficiency, although a different range is possible. These voltages typically are taken from pixels in a row of a frame in a particular order, but another convention may be used to select and order these pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder at the receiving end. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of entries in the code book.

As mentioned, code book 920 has any number of N codes 932-938; in this simple example, the code book has four codes meaning that four analog values 902-908 are encoded at a time. A greater number of codes such as 127 codes, 255 codes, etc., may be used, but due to practical considerations such as circuit complexity, fewer codes are preferably used. As known in the art, code book 920 includes N mutually-orthogonal codes each of length L; in this example L=4. Typically, each code is an SSDS code, but need not necessarily be a spreading code as discussed herein. As shown, each code is divided into L time intervals (also called "chips") and each time interval includes a binary value for that code. As shown at code representation 942, code 934 may be represented in the traditional binary form "1100", although that same code may also be represented as "1 1 −1 −1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter, as is done in CDMA.

Therefore, in order to send the four analog values 902-908 over a transmission medium 34 to a receiver (with a corresponding decoder) the following technique is used. Each analog value will be modulated by each chip in the representation 944 of its corresponding code; e.g., value 902, namely 0.3, is modulated 948 by each chip in the representation 944 of code 932 sequentially in time. Modulation 948 may be the multiplication operator. Thus, modulating 0.3 by code 932 results in the series "0.3, 0.3, 0.3, 0.3". Modulating 0.7 by code 934 becomes "0.7, 0.7, −0.7, −0.7"; value "0" becomes "0, 0, 0, 0"; and "value 1" becomes "1, −1, 1, −1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed at 951 (perceived vertically in this drawing) to obtain analog output levels 952-958; e.g., the summation of modulated values for these time intervals results in output levels of 2, 0, 0.6, −1.4. These analog output levels 952-958 may be further normalized or amplified to align with a transmission line's voltage restrictions, and may then be sent sequentially in time as they are produced over an electromagnetic pathway (such as a differential twisted-pair) of transmission medium 34 in that order. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively encoded synchronously and sent over a single electromagnetic pathway in a sequential series of L analog output levels 952-958. Numerous encoders and electromagnetic pathways may also be used as shown and described herein. Further, the number of N samples that can be encoded in this manner depends upon the number of orthogonal codes used in the code book.

Advantageously, even though the use of robust SSDS techniques (such as spreading codes) results in a significant drop in bandwidth, the use of mutually-orthogonal codes, the modulation of each sample by chips of its corresponding code, summation, and the transmission of N samples in parallel using L output levels results in a significant bandwidth gain. In contrast with traditional CDMA techniques in which binary digits are encoded serially and then summed, the present invention first modulates the entire sample (i.e., the entire analog or digital value, not a single bit) by each chip in a corresponding code, and then sums those modulations at each time interval of the codes to obtain a resultant analog voltage level for each particular time interval, thus exploiting the amplitude of the resultant waveform. It is these analog output levels that are sent over a transmission medium, not representations of binary digits. Further, the present invention facilitates sending analog voltages from one video source to another video sink, i.e., from endpoint to endpoint, unlike CDMA techniques which allow for multiple access by different people, different devices or different sources, and send to multiple sinks. Moreover, compression is not required for the transport of the sample values.

Figure 11:
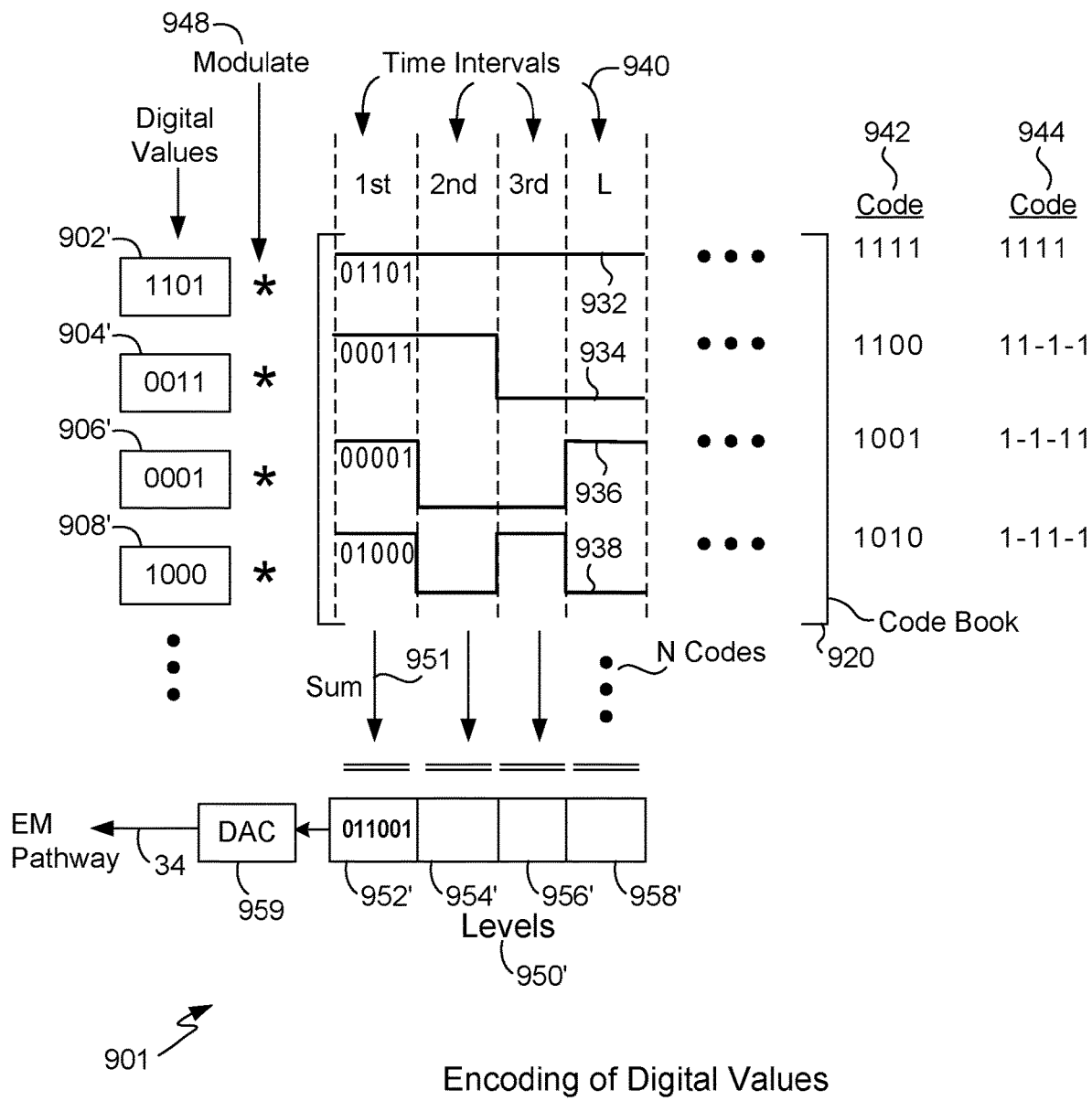
FIG. 11 illustrates a novel encoding technique as being applicable to signal samples that are digital values.

FIG. 11 illustrates this novel encoding technique as being applicable to signal samples that are digital values. Here, digital values 902'-908' are digital representations of voltages. Using a different example of voltages, value 902' is "1101" value 904' is "0011," value 906' is "0001," and value 908' is "1000." Each digital value is modulated (digitally multiplied) by the representation 944 of each code, that is by "1" or by "−1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a −1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway. DAC 959 may be a MAX5857 RF DAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in the visual quality of the resultant image at the display.

Advantageously, entire digital values are modulated, and then these entire modulated digital values are summed digitally to produce a digital output level for conversion and transmission. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital (or analog) encoding technique there will only be a total of L output levels to send, thus having an advantage.

Figure 12:
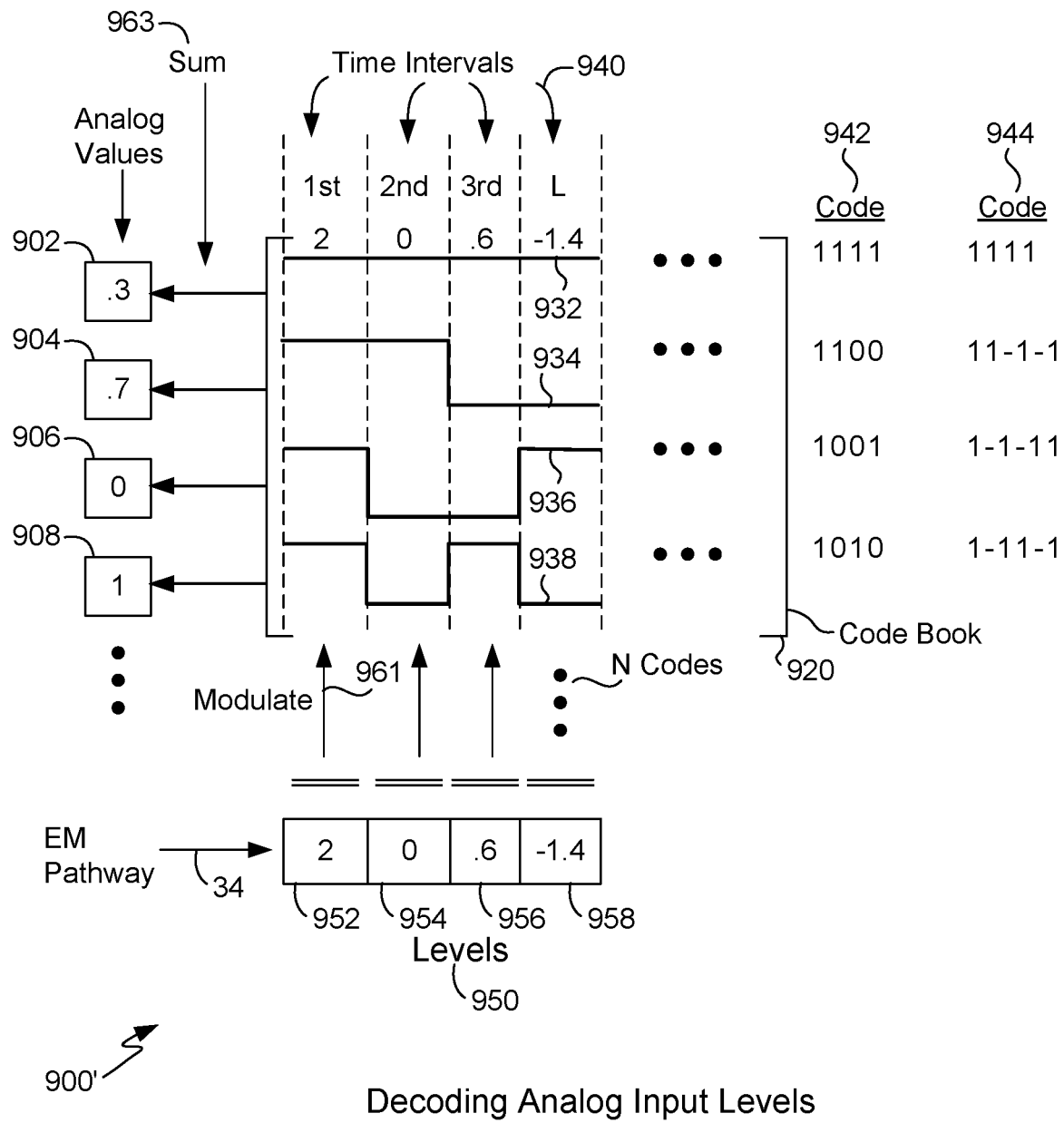
FIG. 12 illustrates decoding of analog input levels that were encoded using the encoder of FIG. 10.

FIG. 12 illustrates the decoding of analog input levels that were encoded using the encoder of FIG. 10. As shown, L input levels 950 have been received over a single electromagnetic pathway of a transmission medium 34. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, 0.6, −1.4". Modulation of levels 952-958 by the second code 934 produces the series of modulated values "2, 0, −0.6, 1.4". Modulation by the third code 936 produces "2, 0, −0.6, −1.4", and modulation by the fourth code 938 produces "2, 0, 0.6, 1.4".

Next, as indicated by the horizontal arrows, each series of modulated values is summed in order to produce one of the analog values 902-908. For example, the first series is summed to produce the analog value "1.2" (which becomes "0.3" after being normalized using the scale factor of "4). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed. Thus, the output vector of N analog values 902-908 has been transported in parallel using L output levels.

Not shown in these examples is an example of decoding digital input levels, although one of skill in the art will find it straightforward to perform such decoding upon reading the encoding of digital values in the above description.

Figure 13A:
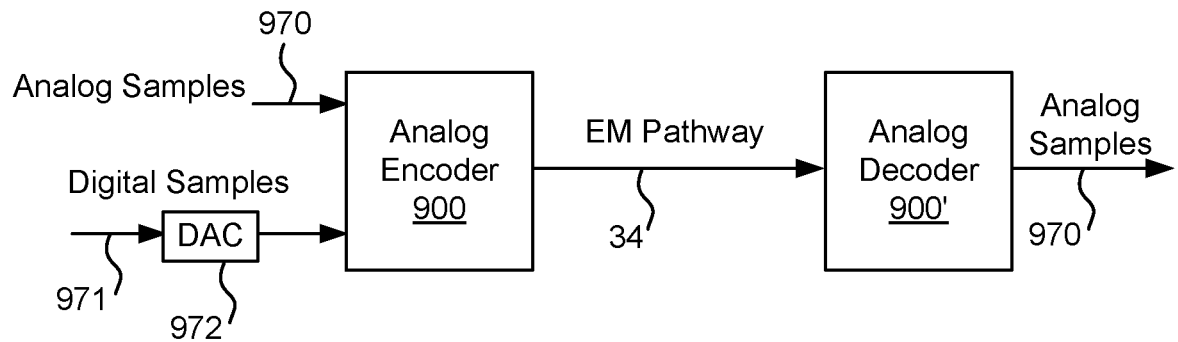
FIG. 13A illustrates use of an analog encoder and a corresponding analog decoder.
Figure 13B:
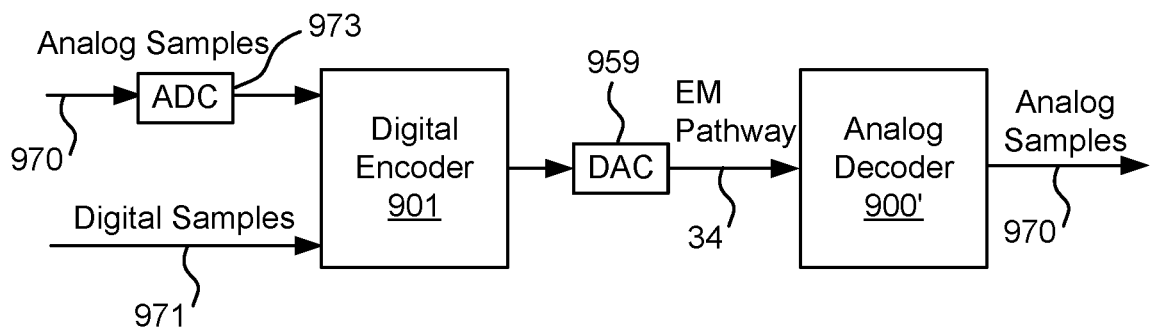
FIG. 13B illustrates use of a digital encoder and a corresponding analog decoder.
Figure 13C:
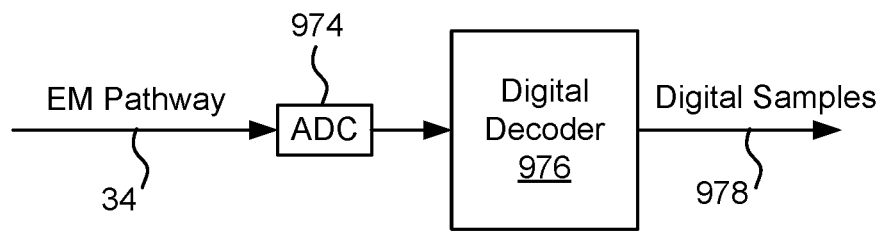
FIG. 13C illustrates use of a digital decoder to decode encoded analog signals that have arrived over an electromagnetic pathway.

FIGS. 13A, 13B and 13C illustrate that the encoders and decoders may operate upon either analog samples or digital samples; the various analog and digital encoders and decoders have previously been described above. As explained above, there may be more than one EM pathway and accordingly more than one encoder/decoder pair and a corresponding number of DACs or ADCs as the case may be.

FIG. 13A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium 34. Analog decoder 900' decodes the encoded analog samples to produce analog samples 970 for output. Analog samples 970 may be used as-is or may be converted into digital samples using an ADC (not shown).

FIG. 13B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 13C illustrates use of a digital decoder to decode encoded analog signals that have arrived over an electromagnetic pathway on transmission medium 34. The encoded analog signals may been transmitted using either the analog encoder or the digital encoder described immediately above. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

FIG. 14 shows a simulation (similar to an idealized oscilloscope trace) of an SSVT waveform 602 sent via an electromagnetic pathway after being output from an analog encoder (or after being digitally encoded and then converted by a DAC). The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example, 32 codes are used, meaning that 32 samples may be transmitted in parallel; thus, voltage levels 980-986 (followed by a number of subsequent voltage levels, depending upon the number of chips in a code, L) form the transmission in parallel of 32 encoded samples (such as pixel voltages from a video source). Subsequent to that transmission, the next set of L voltage levels of waveform 602 represent the transmission of the next 32 samples. In general, waveform 602 represents the encoding of analog or digital values into analog output levels, and the transmission of those levels in discrete time intervals to form a composite analog waveform.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain (i.e., due to an increase in L which also increases electrical resilience) decoded input levels at a decoder are normalized by a scale factor using the code length to recover the transmitted output levels as is known in the art.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A transmitter for transmitting input digital samples, said transmitter comprising:
    an encoder that continuously inputs an input vector of N digital samples and encodes said N digital samples using N orthogonal spreading codes each of length L in order to output L digital levels, each of said codes used with one of said N digital samples and wherein L>=N>=2;
    quadrature amplitude modulation (QAM) mapping circuitry that receives a continuous stream of said L digital levels from said encoder and maps said L digital levels to points in a QAM constellation to obtain in-phase (I) components and out-of-phase (Q) components, wherein said mapping circuitry maps each of said L digital levels to one of said points in said QAM constellation to obtain said in-phase (I) component and out-of-phase (Q) components; and
    QAM circuitry that receives said I and Q components and performs quadrature amplitude modulation using said I and Q components to produce an electromagnetic signal on an electromagnetic pathway representing said continuous input of digital samples.

2. A transmitter as recited in claim 1 wherein said N digital samples originate at a single source and wherein said electromagnetic pathway terminates at a single sink.

3. A transmitter as recited in claim 1 wherein said electromagnetic pathway terminates at a display panel of a display unit and wherein said transmitter is located within said display unit.

4. A transmitter as recited in claim 1 wherein said encoder synchronously encodes said N digital samples into said L digital levels, wherein said N digital samples are represented by said L digital levels.

5. A transmitter as recited in claim 1 further comprising:
    a digital-to-analog converter that accepts said electromagnetic signal and outputs an analog signal on said electromagnetic pathway.

6. A transmitter as recited in claim 1, said transmitter being one of a plurality of P transmitters, each of said P transmitters producing an electromagnetic signal, said electromagnetic signal signals representing a media signal from a single source.

7. A receiver for outputting digital samples, said receiver comprising:
    quadrature amplitude modulation (QAM) circuitry that receives a QAM electromagnetic signal from an electromagnetic pathway and performs QAM demodulation to continuously produce digital in-phase (I) components and digital out-of-phase (Q) components of said QAM electromagnetic signal;
    reverse mapping circuitry that inputs said I components and said Q components and continuously converts said I components and said Q components into digital input levels in accordance with mapping circuitry of a corresponding QAM transmitter, wherein said reverse mapping circuitry converts each point in a QAM constellation to one of said digital input levels; and
    a decoder that continuously inputs L of said digital input levels and decodes said L digital input levels using N orthogonal spreading codes each of length L in order to output an output vector of N digital samples, each of said codes used with one of said N digital samples and wherein L>=N>=2.

8. A receiver as recited in claim 7 wherein said N digital samples originate at a single source and wherein said electromagnetic pathway terminates at a single sink.

9. A receiver as recited in claim 7 wherein said electromagnetic pathway terminates at a display panel of a display unit and wherein said corresponding QAM transmitter is located within said display unit.

10. A receiver as recited in claim 7 wherein said decoder synchronously decodes said L digital input levels into said N digital samples, wherein said N digital samples represent said L digital input levels.

11. A receiver as recited in claim 7 wherein said QAM circuitry includes at least one analog-to-digital converter that produces said digital I and Q components.

12. A transmitter for transmitting input digital samples, said transmitter comprising:
an encoder that continuously inputs an input vector of N digital samples and encodes said N digital samples using N orthogonal spreading codes each of length L in order to output L digital levels, each of said codes used with one of said N digital samples and wherein $L>=N>=2$;
quadrature amplitude modulation (QAM) mapping circuitry that receives a continuous stream of said L digital levels from said encoder and maps said L digital levels to points in a QAM constellation to obtain in-phase (I) components and out-of-phase (Q) components, wherein each digital level received by said mapping circuitry includes most significant bits (MSBs) and least significant bits (LSBs), wherein for each digital level received, said mapping circuitry distributes said MSBs of said each digital level to the MSBs of the in-phase (I) component and to MSBs of the out-of-phase (Q) component, wherein for each digital level received, said mapping circuitry distributes said LSBs of said each digital level to the LSBs of the in-phase (I) component and to the LSBs of the out-of-phase (Q) component, whereby said mapping circuitry obtains said I and Q components; and
QAM circuitry that receives said I and Q components and performs quadrature amplitude modulation using said I and Q components to produce an electromagnetic signal on an electromagnetic pathway representing said continuous input of digital samples.

13. A transmitter as recited in claim 12 wherein said N digital samples originate at a single source and wherein said electromagnetic pathway terminates at a single sink.

14. A transmitter as recited in claim 12 wherein said electromagnetic pathway terminates at a display panel of a display unit and wherein said transmitter is located within said display unit.

15. A transmitter as recited in claim 12 further comprising:
a digital-to-analog converter that accepts said electromagnetic signal and outputs an analog signal on said electromagnetic pathway.

16. A transmitter as recited in claim 12, said transmitter being one of a plurality of P transmitters, each of said P transmitters producing an electromagnetic signal, said electromagnetic signal signals representing a media signal from a single source.

17. A receiver for outputting digital samples, said receiver comprising:
quadrature amplitude modulation (QAM) circuitry that receives a QAM electromagnetic signal from an electromagnetic pathway and performs QAM demodulation to continuously produce digital in-phase (I) components and digital out-of-phase (Q) components of said QAM electromagnetic signal;
reverse mapping circuitry that inputs said I components and said Q components and continuously converts said I components and said Q components into digital input levels in accordance with mapping circuitry of a corresponding QAM transmitter, wherein said reverse mapping circuitry places the most significant bits (MSBs) of each pair of a digital I component and a digital Q component into the MSBs of one of said digital input levels and places the least significant bits (LSBs) of said each pair into the LSBs of said one digital input level; and
a decoder that continuously inputs L of said digital input levels and decodes said L digital input levels using N orthogonal spreading codes each of length L in order to output an output vector of N digital samples, each of said codes used with one of said N digital samples and wherein $L>=N>=2$.

18. A receiver as recited in claim 17 wherein said N digital samples originate at a single source and wherein said electromagnetic pathway terminates at a single sink.

19. A receiver as recited in claim 17 wherein said electromagnetic pathway terminates at a display panel of a display unit and wherein said corresponding QAM transmitter is located within said display unit.

20. A receiver as recited in claim 17 wherein said QAM circuitry includes at least one analog-to-digital converter that produces said digital I and Q components.

21. A transmitter for transmitting input digital samples, said transmitter comprising:
an encoder that continuously inputs an input vector of N digital samples and encodes said N digital samples using N orthogonal spreading codes each of length L in order to output L digital levels, each of said codes used with one of said N digital samples and wherein $L>=N>=2$;
quadrature amplitude modulation (QAM) mapping circuitry that receives a continuous stream of said L digital levels from said encoder and maps said L digital levels to points in a QAM constellation to obtain in-phase (I) components and out-of-phase (Q) components, wherein every odd-numbered one of said L digital levels produces said I components and every even-numbered one of said L digital levels produces said Q components; and
QAM circuitry that receives said I and Q components and performs quadrature amplitude modulation using said I and Q components to produce an electromagnetic signal on an electromagnetic pathway representing said continuous input of digital samples.

22. A transmitter for transmitting input digital samples, said transmitter comprising:
an encoder that continuously inputs an input vector of N digital samples and encodes said N digital samples using N orthogonal spreading codes each of length L in order to output L digital levels, each of said codes used with one of said N digital samples and wherein $L>=N>=2$;
quadrature amplitude modulation (QAM) mapping circuitry that receives a continuous stream of said L digital levels from said encoder and maps said L digital levels to points in an M-QAM constellation to obtain in-phase (I) components and out-of-phase (Q) components, wherein half of every $\log_2(M)$ bits of each of said L digital levels produces said I components and the other half of said every $\log_2(M)$ bits of each of said L digital levels produces said Q components; and
QAM circuitry that receives said I and Q components and performs quadrature amplitude modulation using said I and Q components to produce an electromagnetic signal on an electromagnetic pathway representing said continuous input of digital samples.

* * * * *